Patented June 21, 1949

2,473,630

UNITED STATES PATENT OFFICE 2,473,630

POLYCHLOROPHENOLS IN FERMENTATION OF CARBOHYDRATES

Antonio Barreto, Rio de Janeiro, Brazil, assignor to Monsanto Chemical Company, St. Louis, Mo., a corporation of Delaware No Drawing. Application June 2, 1944, Serial No. 538,544

5 Claims. (Cl. 195—123)

The present invention relates to the fermentation of carbohydrate mashes or other fermentable materials containing appreciable amounts of harmful bacteria or other contaminating organisms. More particularly the invention relates to the sterilization of mashes of the type described for the purpose of increasing the yield of alcohol obtainable therefrom.

In the fermentation of grain it has been customary to cook the mash for extended periods prior to malting and fermenting. This not only gelatinizes or breaks down the starch, but tends to rid the mash of all bacteria before it is inoculated with the yeast or other enzyme-producing material. Unfortunately, however, this does not entirely eliminate the bacteria problem in grain fermentations, as considerable quantities of bacteria are present in the malt, which cannot be sterilized by means of heat without at least partially destroying its diastatic powers. In the fermentation of molasses mash, on the other hand, extended heating periods are not required, and the molasses mash is heated, if at all, solely for the purpose of destroying bacteria. Nevertheless, it would be desirable to avoid even this limited heating for obvious reasons of economy.

It is accordingly a primary object of the invention to provide a method of sterilizing fermentable materials without the use of heat.

A further object of the present invention is to provide an improved method of avoiding contamination of the mash during all stages of the manufacture of alcohol therefrom, and particularly during the fermentation stage.

Still further objects and advantages of the invention will appear from the following description and appended claims. Before explaining in detail the present invention, however, it is to be understood that the invention is not limited in its application to the details described herein, since the invention is capable of other embodiments and of being practiced or carried out in various ways.

The invention is in general predicated on the discovery that contamination can be avoided or minimized and the yield of alcohol correspondingly increased by treating the mash at some stage of the manufacture prior to fermentation or even during the fermentation with small amount of a polychlorophenol, preferably in the form of a water-soluble salt, such as for example, a sodium of potassium salt. As the fermentation is usually carried out at a pH between 3 and 6, under which conditions the phenate would be converted to the corresponding phenol, it can be seen that the use of a polychlorophenol, per se, is equally feasible, the chief advantage of the alkali salts being in their greater solubility in water.

The polychlorophenols particularly contemplated by the present invention are trichlorophenols, tetrachlorophenols and pentachlorophenols, the penta derivatives being preferred.

In the treatment of grain the concentration of the polychlorophenol used may be as high as 0.1 gram per liter of mash being fermented, but the preferred concentration range is between 0.025 and 0.05 gram per liter, as in some instances a portion of the yeast is destroyed when larger amounts are used, thereby causing a reduction in the conversion of sugar to alcohol. Thus, in general there is an optimum amount of pentachlorophenol which is sufficient to obtain the highest increase in alcohol production, yet insufficient to cause any appreciable destruction of the yeast and consequent lowering of the yield. This may vary with different mashes, and is to some extent dependent upon the degree of infection present in the mash.

A more complete understanding of the invention will be obtained from the following tests:

Three different batches of mash were cooked, malted and cooled in accordance with standard practice in the manufacture of alcohol from grain, using sufficient wheat meal, malt and water to obtain in each case a concentration of 172 grams of total grains (meal and malt) per liter. The resulting batches were found to be contaminated with varying amounts of bacteria and other contaminating organisms. Four samples containing 800 grams each were separated from each batch, one in each case being used as a blank, and the others having added thereto varying amounts of a sodium pentachlorophenate solution (containing 1 gram of the phenate per liter of water). Sufficient water was then added to each sample until the total volume in each case was a liter. Forty cubic centimeters of yeast were then added to each sample, together with standard amounts of yeast food, after which the samples were placed in two-quart Mason jars and incubated for 72 hours at a constant temperature of 88° F. The samples were then analyzed for their alcohol content by distillation, and the yield of alcohol in the treated samples compared with the yield of alcohol in the untreated samples, as tabulated below:

| Batch | Sodium pentachlorophenate in grams per liter | Percent alcohol by volume in fermented mash |
|---|---|---|
| I | None | 6.30 |
|   | 0.01 | 6.65 |
|   | 0.05 | 6.90 |
|   | 0.10 | 7.10 |
| II | None | 6.30 |
|    | 0.01 | 6.95 |
|    | 0.05 | 6.80 |
|    | 0.10 | 6.75 |
| III | None | 6.70 |
|     | 0.01 | 6.90 |
|     | 0.05 | 6.95 |
|     | 0.10 | 6.75 |

It can be seen from the above tabulations that increases in alcohol as high as 12% based on the alcohol obtained in the blank run were obtained with the use of the pentachlorophenate.

The polychlorophenols described herein may be added at any stage prior to fermenting or even during the fermentation, but are preferably added just after the mash is cooled down. By using the polychlorophenols, it is possible to obtain yield increases as high as one proof gallon per hundred pounds of dry grains, or higher, but this is dependent upon the extent of contamination in the mash. It is also possible to shorten the cooking period, when the mash is chemically treated in the manner described herein.

In addition to treating the mash prior to the fermentation, it is also advantageous to wash the cookers, pipe lines and fermenters daily with a hot solution of sodium pentachlorophenate containing from 7.5 to 10 pounds of phenate per 3000 gallons of water. However, good results may be obtained without resorting to such supplemental washing.

Polychlorophenols of the type described herein may also be used in molasses fermentations, but considerably smaller amounts must be used, namely of the order of one tenth as much as is required in the fermentation of grain, if destruction of the yeast is to be avoided. This is probably due to the fact that in grain mashes the pentachlorophenol has less bactericidal action than in molasses mashes, which in turn is probably due to the fact that the nitrogenous material in grain mashes exerts a protective action on the bacteria, thereby requiring the use of larger amounts of the bactericidal agent than would otherwise be necessary.

It has also been found that yeast will acclimate itself to pentachlorophenols, and that when the same yeast is exposed progressively to small amounts of such phenols, it is possible to use larger total amounts than would otherwise be possible without destroying some of the yeast.

The action of the pentachlorophenols and their water-soluble salts on the fermentation process is not entirely understood, but it is believed that small amounts of these substances tend to destroy or immobilize the harmful bacteria normally present in grain mashes and other fermentable materials. If not immobilized, the harmful bacteria tend to destroy the yeast, and/or cause a drop in the pH of the mash, which in turn interferes with the conversion of the starch to sugar. Regardless of the mechanism of their action, however, the polychlorophenols cause a marked increase in the yield of alcohol as compared with the fermentations in which their use is omitted.

The term "carbohydrate mash" or "carbohydrate mashes" as used in the appended claims is intended to include not only the usual grain mashes, but also such materials as molasses and other bacteria-containing fermentable substances.

What I claim is:

1. The improvement in the fermentation of bacteria-containing grain mashes in the presence of a yeast which comprises sterilizing the mash with small amounts of a pentachlorophenol, said pentachlorophenol being present in an amount varying between 0.025 and 0.1 gram per liter of the mash.

2. In a process of fermenting bacteria-containing grain mashes in the presence of a yeast, the improvement which comprises adding to the mash at some stage prior to its fermentation small amounts of a water-soluble salt of a polychlorophenol, said salt being added in an amount varying between 0.025 and 0.1 gram per liter of the mash.

3. In a process of fermenting bacteria-containing grain mashes in the presence of a yeast, the improvement which comprises adding to the mash at some stage prior to its fermentation small amounts of a polychlorophenol, said polychlorophenol being added in an amount varying between 0.025 and 0.1 gram per liter of the mash.

4. In a process of fermenting bacteria-containing grain mashes in the presence of a yeast, the improvement which comprises adding to the mash just prior to its fermentation small amounts of sodium pentachlorophenate, said pentachlorophenate being added in an amount varying between 0.025 and 0.1 gram per liter of the mash.

5. In a process of fermenting bacteria-containing grain mashes in the presence of yeast, the improvement which comprises adding to the mash just prior to its fermentation small amounts of sodium pentachlorophenate, said pentacholorophenate being added in amounts varying between 0.025 and 0.05 gram per liter of the mash.

ANTONIO BARRETO.

REFERENCES CITED

The following references are of record in the file of this patent:

UNITED STATES PATENTS

| Number | Name | Date |
|---|---|---|
| 432,861 | Carez | July 22, 1890 |
| 620,022 | Effront | Feb. 21, 1899 |
| 621,796 | Collette et al. | Mar. 28, 1899 |
| 884,576 | Fritsche | Apr. 14, 1908 |
| 1,061,494 | Pollak | May 13, 1913 |
| 1,580,500 | Kusserow | Apr. 13, 1926 |
| 1,938,081 | Meyer | Dec. 5, 1933 |
| 1,938,912 | Karmann | Dec. 12, 1933 |
| 1,991,329 | Mills | Feb. 12, 1935 |